United States Patent Office 3,143,554
Patented Aug. 4, 1964

3,143,554
ACETYLENICALLY UNSATURATED ALCOHOLS
David Adriaan van Dorp, Vlaardingen, and Daniel van der Steen, Leiden, Netherlands, assignors to Lever Brothers Company, New York, N.Y., a corporation of Maine
No Drawing. Filed Apr. 24, 1961, Ser. No. 104,801
Claims priority, application Great Britain Apr. 27, 1960
6 Claims. (Cl. 260—345.9)

This invention relates to new chemical compounds being acetylenically unsaturated alcohols and to a process for their preparation. The invention also concerns derivatives of such alcohols and a process for their preparation.

The acetylenically unsaturated alcohols of the invention have the general formula $$H(C{\equiv}C{-}CH_2{-})_n OH$$

in which $n$ is a small whole number greater than 1, for examples 2 to 4, preferably 2 or 3. As examples of the compounds of the invention may be mentioned hex-2,5-diyn-1-ol and non-2,5,8-triyn-1-ol.

The compounds of the invention can be used as hypnotics and as intermediates for the synthesis of higher polyynic and polyenic compounds.

Further, the invention provides a process for the preparation of these new compounds, the process comprising reacting a propargyl halide with a metal derivative having the general formula $$M[\{(C{\equiv}C{-}CH_2{-})_{n-1}O\}_p R]_{q/p}$$

wherein $n$ has the aforesaid meaning,
M is a Grignard metal monohalide group, preferably a magnesium monohalide group, or an alkali or alkaline-earth metal such as, for example, lithium, sodium, potassium or calcium, preferably lithium or sodium;
R is hydrogen, M or an organic group unaffected by the reaction but replaceable by hydrogen to convert the reaction product into the corresponding alcohol such as the tetrahydropyranyl group or benzyl group; and
$p$ and $q$ are the valencies of R and M respectively.

and, where R is other than hydrogen, converting the reaction product into the corresponding alcohol. The reaction should be carried out in an inert solvent and under an inert atmosphere. When the metal derivative is a Grignard type compound the reaction is preferably carried out in the presence of a catalyst such as, for instance, cuprous chloride, cuprous bromide, cuprous cyanide, cobaltous chloride or cobaltous bromide.

As suitable solvents can be used the usual solvents for reactions of metal acetylides, such as for example, ether, benzene, tetrahydrofuran or mixtures of these or liquid ammonia. For the alkali and alkaline-earth metal derivatives, liquid ammonia or benzene is preferred, while for Grignard type compounds tetrahydrofuran is preferred. The solvents should be free of peroxides and substantially free of water.

To provide the insert atmosphere, nitrogen, for example, can be used. The gas should be substantially free of oxygen and water vapour.

The invention also provides derivatives of the above defined alcohols being compounds of the formula $$[H(C{\equiv}C{-}CH_2{-})_n O]_{p'} R'$$

where $n$ has the above meaning, R' is a Grignard metal monohalide group, or an alkali or alkaline-earth metal, preferably lithium, or an organic group which can be replaced by hydrogen to convert the compound into the corresponding alcohol, preferably the tetrahydropyranyl group, and $p'$ is the valency of R'. These derivatives may be prepared by reacting a propargyl halide with a metal derivative of the general formula $$M[\{(C{\equiv}C{-}CH_2{-})_{n-1}O\}_{p'} R']_{q/p'}$$

where M is a Grignard metal monohalide group or an alkali or alkaline-earth metal. The reaction is carried out as described above for the preparation of the corresponding alcohols.

The metal derivatives $$[Li(C{\equiv}C{-}CH_2{-})_{n-1}O]_p R$$

may be prepared by reacting $$[H(C{\equiv}C{-}CH_2)_{n-1}O]_p R$$

with methyl lithium or with lithium amide dissolved in liquid ammonia. Other alkali metal and alkaline-earth metal derivatives may be prepared by similar methods.

The following examples illustrate the invention.

*Example 1*

45 cc. dry ether free of peroxides and 1 g. ethyl bromide were added to 12.1 g. magnesium. After the reaction had started, a solution of 53.5 g. ethyl bromide in 50 cc. ether were added during one hour, while slowly stirring the reaction mixture. After the addition was completed, the reaction mixture was heated to boiling for 50 minutes under reflux conditions. After cooling to room temperature, 250 cc. freshly distilled tetrahydrofuran were added and subsequently, during one hour, a solution of 14.1 g. propargyl alcohol in 40 cc. tetrahydrofuran. The reaction mixture started to boil during the addition and the boiling was continued for 1¾ hours after completion of the addition.

When the reaction mixture had cooled to room temperature again, 0.69 g. cuprous chloride were added and stirred for 5 minutes, followed by the addition of a solution of 30 g. propargyl bromide in 20 cc. tetrahydrofuran in 20 minutes. The reaction mixture was then heated to boiling temperature and kept at this temperature for 3½ hours under reflux conditions.

The reactions were carried out under an atmosphere of nitrogen.

After cooling to room temperature, the reaction mixture was treated with 125 cc. of a saturated solution of ammonium chloride. The precipitate formed was filtered off after cooling and the addition of 150 cc. ether. After the addition of 100 cc. ether, the filtrate was washed several times with a small quantity of water. After drying over anhydrous magnesium sulphate and removal of ether and tetrahydrofuran, 7.25 g. (30.7% of the theoretical yield) of hex-2,5-diyn-1-ol were distilled off at a pressure of 0.5 mm., showing a boiling point of 61°–64° C. After redistillation, the product showed a boiling point of 49°–52° C./0.65 mm., a (25% theoretical) yield of 5.9 g. and an $n_D^{20} = 1.5052$.

*Example 2*

The process as described in Example 1 was repeated using tetrahydrofuran instead of ether. In this way, by using only tetrahydrofuran as a solvent, the yield was increased to 8.6 g. (36.3% of the theoretical yield) before redistillation and 7.2 g. (30% of the theoretical yield) after redistillation.

The preparation of non-2,5,8-triyn-1-ol can be carried out in a manner similar to that described in Examples 1 and 2 by employing hex-2,5-diyn-1-ol, or a derivative thereof in which the hydroxyl group is suitably protected, instead of propargyl alcohol.

*Example 3*

0.8 g. phosphorus oxychloride were added to a mixture of 67.2 g. propargyl alcohol and 100.8 g. dry 2,3-dihydropyran while continuously stirring. The reaction flask was cooled with ice in order to moderate the rate of reaction. Stirring was continued for 2 hours at room temperature. Subsequently 32 cc. potassium hydroxide (1 N) were added and the water layer then formed was separated off. After addition of 200 cc. ether to the reaction mixture, the solution was washed with water and then dried overnight over anhydrous sodium sulphate. After distilling off the ether, a fraction of 137.1 g. was obtained having a boiling range of 62°–69° C. at 12 mm. pressure. This fraction was redistilled at 70°–72° C. and 13 mm. pressure. Thus 127.4 g. (75.8% of the theoretical yield) of 2-prop-2'-yn-1'-oxy-tetrahydropyran with an $n_D^{20}=1.4571$ were obtained.

Subsequently a solution of 28.2 g. of this 2-prop-2'-yn-1'-oxy-tetrahydropyran in 32 cc. tetrahydrofuran was added dropwise in 20 minutes to a solution of 200 cc. dry tetrahydrofuran, 60 cc. ether and 0.201 mol. ethyl magnesium bromide. This reaction mixture was refluxed for 2 hours. After cooling to room temperature, 0.55 g. cuprous chloride were added and after stirring for 10 minutes, a solution of 24 g. propargyl bromide in 16 cc. tetrahydrofuran was added dropwise in 30 minutes. The mass had then reached boiling temperature and was refluxed for 3¾ hours. The reaction mixture was then cooled, and 50 cc. of a saturated ammonium chloride solution were added. The precipitate was filtered off and washed with four 25 cc. portions of ether. The combined ether extracts were washed with five 25 cc. portions of water, after which no more chlorine ions could be detected. After drying over anhydrous magnesium sulphate and distilling off the ether and tetrahydrofuran, a fraction of 24.1 g. was obtained having a boiling range of 65°–79° C. at 0.3 mm. pressure. Redistillation at 75.5°–76.5° C. and 0.18 mm. pressure yielded 22.4 g. (62.4% of the theoretical yield) of 2-hex-2',5'-diyn-1'-oxy-tetrahydropyran with an $n_D^{20}=1.4871$. The synthesis was carried out entirely under dry, oxygen-free nitrogen.

The preparation of 2-non-2',5',8'-triyn-1'-oxy-tetrahydropyran can be carried out in a manner similar to that described in Example 3 by employing hex-2,5-diyn-1-ol instead of propargyl alcohol.

The tetrahydropyranyl group may be removed and the acetylenically unsaturated alcohol obtained by acid catalysed hydrolysis, such as, for example, by means of a catalytic amount of p-toluenesulphonic acid in methanolic solution.

What is claimed is:

1. An acetylenically unsaturated alcohol having the formula $$H(C{\equiv}C{-}CH_2{-})_nOH$$

in which $n$ is an integer having a value of from 2 to 4.

2. An acetylenically unsaturated alcohol as claimed in claim 1 wherein $n$ is 2.

3. An acetylenically unsaturated alcohol as claimed in claim 1 wherein $n$ is 3.

4. A compound of the formula $$[H(C{\equiv}C{-}CH_2{-})_nO]_{p'}R'$$

where $n$ is an integer having a value of from 2 to 4, $R'$ is a group selected from the class consisting of Grignard metal monohalide groups, alkali and alkaline-earth metals, 2-tetrahydropyranyl and benzyl and $p'$ is the valency of $R'$.

5. A compound as claimed in claim 4 wherein $R'$ is lithium.

6. A compound as claimed in claim 4 wherein $R'$ is the 2-tetrahydropyranyl group.

References Cited in the file of this patent

UNITED STATES PATENTS

| | | |
|---|---|---|
| 2,855,441 | Sondheimer | Oct. 7, 1958 |
| 2,934,570 | Goldberg et al. | Apr. 26, 1960 |

OTHER REFERENCES

Butenandt et al., Chemische Berichte, volume 88, pages 1186–7 (1955).

Fieser et al., Advanced Organic Chemistry, pages 213–243, Reinhold Publishing Corp., New York (1961).